April 22, 1941.   E. M. SPLAINE   2,238,919
OPHTHALMIC MOUNTING
Filed Jan. 5, 1939
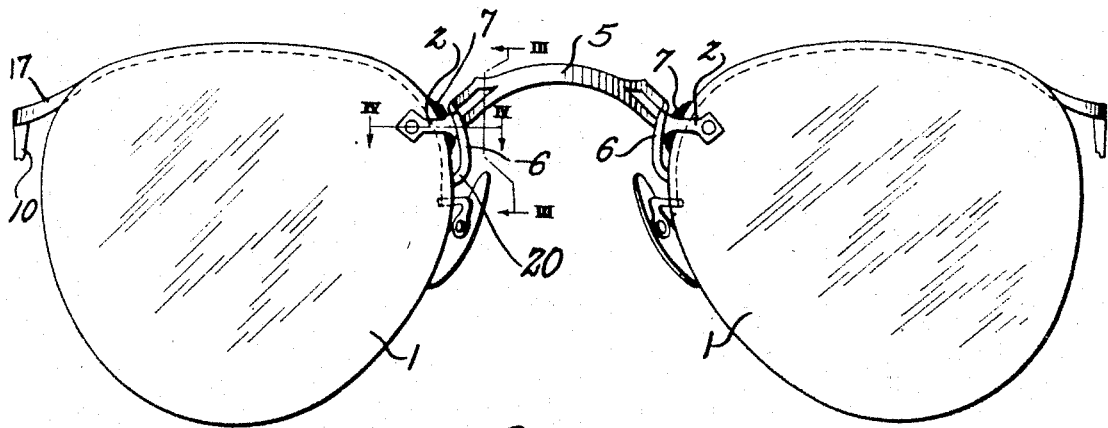
Fig. I
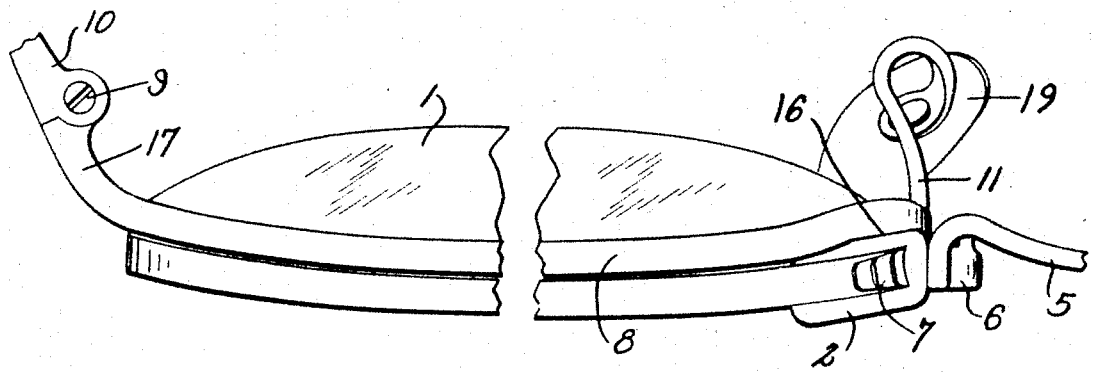
Fig. II
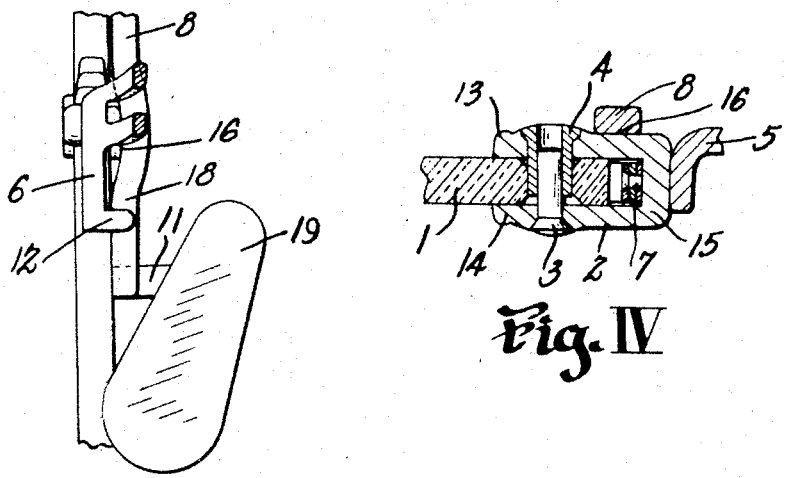
Fig. III    Fig. IV
INVENTOR.
EDWARD M. SPLAINE
BY Harry H. Styll
ATTORNEY.

Patented Apr. 22, 1941

2,238,919

UNITED STATES PATENT OFFICE 2,238,919

OPHTHALMIC MOUNTING

Edward M. Splaine, Southbridge, Mass., assignor to American Optical Company, Southbridge, Mass., a voluntary association of Massachusetts Application January 5, 1939, Serial No. 249,372

4 Claims. (Cl. 88—47)

This invention relates to improvements in ophthalmic mountings of the type known as semi-rimless mountings.

One of the principal objects of the invention is to provide a new and improved ophthalmic mounting of the type having lens supporting means constituting a bridge member, a relatively long and slender temple supporting member shaped substantially to the upper contour edges of the lenses so associated with each other and with the lenses that the said lenses will be relieved from shock or strain imparted to said members.

Another object of the invention is to provide an improved supporting structure of the above character, whereby the point of joinder of said members is greatly reenforced to increase the strength and rigidity thereof.

Another object is to provide an ophthalmic mounting of the above character having its lens holding means positioned adjacent the upper contour edges of the lenses with the relatively long temple supports and bridge means secured to said lens holding means and each provided with depending portions secured together at a point spaced from said lens holding means to increase the strength and rigidity of the mounting at said location.

Another object is to provide an ophthalmic mounting of the above character with resilient portions and with resilient means for supporting the lenses, whereby said lenses as well as other parts of the mounting will be relieved from shock and strain.

Another object is to provide a mounting of the type described, wherein the temple supports have portions supporting the nose pads so that said pads may be adjusted to fit the facial requirements of the wearer.

Other objects and advantages of the invention will become apparent from the following description taken in connection with the accompanying drawing, and it will be understood that many changes may be made in the details of construction and arrangements of parts shown and described without departing from the spirit of the invention as expressed in the accompanying claims. I, therefore, do not wish to be limited to the exact details of construction and arrangement of parts herein disclosed, as the preferred form only has been given by way of illustration.

Referring to the drawing:

Fig. I is a front elevation of an ophthalmic mounting embodying the invention.

Fig. II is a fragmentary top plan view, an on enlarged scale, of a portion of the mounting shown in Fig. I.

Fig. III is a sectional view taken on line III—III of Fig. I; and

Fig. IV is a sectional view taken on line IV—IV of Fig. I and looking in the direction of the arrows.

Referring more particularly to the drawing wherein similar reference characters designate like parts throughout the several views, the mounting embodying the invention comprises broadly, a pair of lenses 1, having a bridge member 5 secured thereto by lens holding means 2. The lens holding means 2 are positioned adjacent the upper nasal edges of the lenses and are provided with portions 13 and 14 shaped to overlie the opposed surfaces of the lenses and edge portions 15 shaped to overlie the adjacent edges of the lenses. The portions 13 and 14 are secured to the lenses 1 by any suitable securing means known in the art, such as solder uniting pin and tubular means 3 and 4, as shown in Fig. IV, screws, or any other known connecting means which extend through connecting openings formed in the lenses. The lens holding means are provided with resilient means 7 positioned between the edge of the lens and the portion 15 overlying the said edge. The said resilient means is adapted to resiliently limit the pivotal movement of the lens holding means on the lens.

The bridge member 5 has a central arch portion shaped to span the nose and has forwardly and downwardly extending side portions 6. The said bridge member is secured to the lens holding means 2 adjacent the opposing ends of the central arch portion with the said side portions 6 lying in a plane substantially normal to the plane of the lenses.

The central arch portion of the bridge may be formed relatively rigid, ductile or resilient, or may possess one or more of said characteristics.

The mounting is provided with relatively long and slender temple supporting members 8 shaped substantially to the upper contour shape of the lenses. The said temple supporting members 8 are secured at 16 to the rear surface of the lens holding means 2, as illustrated in Figs. II and IV and are provided adjacent their outer ends with rearwardly extending portions 17 terminating in temple connections, to which the temples 10 are pivotally attached, as illustrated at 9. The rearwardly extending portions 17 are preferably located above a useful field of side vision and above the normal line of sight through the lenses when the mounting is in position of use on the face. The said temple supports 8 have portions 18 extending downwardly from their points of connection 16, with the lens holding means 2. These downwardly extending portions 18 are shaped substantially to the adjacent contour edges of the lenses and provide means to which rearwardly extending nose pad supporting arms 11 are attached. Suitable nose pads 19 are pivotally or rigidly supported by said arms 11.

It is particularly pointed out that the depending side portions 6 of the bridge are provided with rearwardly extending tongues 12, joined with the depending portions 18 of the temple supports by soldering, welding or other suitable means.

It is understood that the bridge connection with the lens holding means or connections of the temple supporting members 8 with said lens holding means, as well as other connected parts of the mounting, may be joined by soldering, welding or by any other means known in the art. It is to be understood that some or all of the parts may be formed integral if desired.

Although the temple supports 8 are shown as being positioned in the rear of the plane of the lenses and with the upper surfaces thereof substantially flush with the upper edges of the lenses, the said temple supports may be positioned in the plane of said lenses or in the front of the plane of said lenses as desired. It is desirable, however, that they be shaped substantially to follow the upper contour shape of the lenses.

It is also to be understood that the said temple supports may be secured to the bridge adjacent the lens straps or partially to the bridge and straps as desired.

It is also to be noted that the long ends of the depending side portions 6 are deflected outwardly as illustrated at 20 as well as being provided with the rearwardly extending tongues 12.

The depending portions 18 of the temple supports 8 and the depending side portions 6 of the bridge are preferably formed relatively rigid, the remainder of said temple supports, however, may be formed relatively rigid, ductile or resilient or may have portions thereof possessing one or more of said characteristics. The preferable arrangement is to form said supports relatively rigid throughout the portions thereof which are shaped to follow the upper contour edges of the lenses. The rearwardly extending end portions 17 may, however, be formed rigid, ductile or resilient as desired.

The relatively long temple supports 8 are readily adjustable to lenses having differently shaped upper contour edges and also to meet the requirements of different individuals. They relieve the lenses from shock and strain and yet provide means whereby the position of the temples relative to the lenses may be definitely controlled, that is, as to height and as to distance between said temples. In addition to all of the above desirable features the said temple supports are relatively inconspicuous when the mounting is viewed from the front.

From the foregoing it will be seen that I have provided simple, efficient and economical means for obtaining all of the objects and advantages of the invention, namely, the provision of an ophthalmic mounting having temple supporting arms following the upper contour edges of the lenses and a bridge member connecting the lenses and so positioned with respect to the lenses as to give substantially a streamline appearance therewith, and having depending portions associated with the depending portion of the temple supporting members adjacent the bridge to greatly reinforce the mounting at said locations.

Having described my invention, I claim:

1. In an ophthalmic mounting, the combination of a pair of lenses, lens holding means pivotally secured to said lenses and having resilient means for limiting such pivotal movement, bridge means joining said lens holding means for supporting the lenses in desired aligned relation with each other, and relatively long and slender temple supporting arms joined with said lens holding means and having portions shaped substantially to the upper contour edge of the lenses and terminating in temple connections, with said temple supporting arms being connected to said lens holding means at points lying to the rear of said lenses and to said bridge member at points on said arms removed from said lens supporting members in a downwardly direction and lying to the rear of said lenses, said bridge member having a portion adjacent each of said temple arms extending between the said temple arm connections thereof and lying in spaced relation and in substantial alignment therewith so as to allow working of said spaced portions and to provide a strong connection which relieves breaking strain on said bridge and temple arm connections, said temple arms extending downwardly beyond said connections and terminating in nose pad support connections.

2. An ophthalmic mounting for use in combination with a pair of lenses, said mounting comprising lens holding means adapted to be pivotally secured to said lenses and having resilient means for limiting said pivotal movement, bridge means joining said lens holding means for supporting the lenses in desired aligned relation with each other, and relatively long and slender temple supporting arms joined with said lens holding means and having portions adapted to be shaped substantially to the upper contour edge of the lenses and terminating in temple connections, with said temple supporting arms being connected to said lens holding means at points lying to the rear of said lenses and to said bridge member at points on said arms removed from said lens holding means in a downward direction and lying to the rear of said lenses when in position thereon, said bridge member having a portion adjacent each of said temple arms extending between the said temple arm connections thereof and lying in spaced relation and in substantial alignment therewith so as to allow working of said spaced portions and to provide a strong connection which relieves breaking strain on said bridge and temple arm connections, said temple arms extending downwardly beyond said connection and terminating in nose pad support connections.

3. In an ophthalmic mounting, the combination of a pair of lenses, lens holding means secured to said lenses on the nasal sides thereof, bridge means joining said lens holding means for supporting the lenses in desired aligned relation with each other and relatively long and slender temple supporting arms joined with said lens holding means and having portions shaped substantially to the upper contour edge of the lenses and terminating in temple connections, said long and slender temple supporting arms and said bridge member having portions extending below their points of attachment with said lens holding means with the major portions thereof in spaced relation with each other and joined together at a point spaced from said lens holding means and free from said lenses so as to allow working of said spaced portions relative to said lenses and to each other between said connections and to provide a strong connection which relieves breaking strain on said temple arm connections, and nose pad supporting arms extending rearwardly of said depending portions from adjacent the lower connections thereof.

4. An ophthalmic mounting for use in combination with a pair of lenses, said mounting comprising lens holding means adapted to be secured to said lenses, bridge means joining said lens holding means for supporting the lenses in desired aligned relation with each other and relatively long and slender temple supporting arms joined with said lens holding means and having portions shaped substantially to the upper contour edge of the lenses and terminating in temple connections, said long and slender temple supporting arms and said bridge member having portions extending below their points of attachment with said lens holding means with the major portions thereof in spaced relation with each other and joined together at a point spaced from said lens holding means and unattached with said lenses so as to allow working of said spaced portions relative to said lenses and to each other between said connections and to provide a strong connection which relieves breaking strain on said temple arm connections, and nose pad supporting arms extending rearwardly of said depending portions from adjacent the lower connections thereof.

EDWARD M. SPLAINE.